US008342565B2

(12) United States Patent
Hata

(10) Patent No.: US 8,342,565 B2
(45) Date of Patent: Jan. 1, 2013

(54) CROSS MEMBER-INTEGRATED TRUNNION BRACKET

(75) Inventor: Atsushi Hata, Tokyo (JP)

(73) Assignee: Hino Motors, Ltd., Hino-shi (JP)

( * ) Notice: Subject to any disclaimer, the term of this patent is extended or adjusted under 35 U.S.C. 154(b) by 107 days.

(21) Appl. No.: 13/059,239

(22) PCT Filed: Aug. 19, 2009

(86) PCT No.: PCT/JP2009/003939
§ 371 (c)(1),
(2), (4) Date: Feb. 16, 2011

(87) PCT Pub. No.: WO2010/023843
PCT Pub. Date: Mar. 4, 2010

(65) Prior Publication Data
US 2011/0148065 A1   Jun. 23, 2011

(30) Foreign Application Priority Data

Aug. 27, 2008  (JP) .................................. 2008-218468
Aug. 27, 2008  (JP) .................................. 2008-218469

(51) Int. Cl.
*B60G 5/047*   (2006.01)
*B60G 5/053*   (2006.01)
*B60G 5/06*   (2006.01)
(52) U.S. Cl. .................... 280/680; 280/124.11; 280/686
(58) Field of Classification Search ............. 280/124.11, 280/680, 676, 677, 682, 686, 124.1, 124.116, 280/124.156, 124.163, 81.1; 180/24.01; *B60G 9/02, B60G 5/00, 5/01, 5/02, 5/03, 5/04, 5/047, B60G 5/053, 5/06, 7/00, 7/02; B62D 21/11*
See application file for complete search history.

(56) References Cited

U.S. PATENT DOCUMENTS

| 1,705,137 | A | * | 3/1929 | Rayburn et al. | ............... 280/680 |
| 1,946,060 | A | * | 2/1934 | Buckendale | .................. 280/680 |
| 2,139,937 | A | * | 12/1938 | Collender | .................. 180/24.01 |
| 2,227,448 | A | * | 1/1941 | Freeman | ......................... 280/680 |
| 2,351,001 | A | * | 6/1944 | Buckendale | .................. 280/680 |

(Continued)

FOREIGN PATENT DOCUMENTS

EP    1203676 A1 * 5/2002

(Continued)

OTHER PUBLICATIONS

Japan Institute of Invention and Innovation, Journal of Technical Disclosure No. 90/3110, (JIII), vol. 15-11, Total p. 1, Fig.2, (Feb. 20, 1990).

(Continued)

*Primary Examiner* — Joseph Rocca
*Assistant Examiner* — Keith Frisby
(74) *Attorney, Agent, or Firm* — Oblon, Spivak, McClelland, Maier & Neustadt, L.L.P.

(57) ABSTRACT

In order to drastically reduce the effort and time required for the alignment adjustment over a conventional case to significantly alleviate the work burden, a cross member-integrated trunnion bracket 20 includes a cross member 16 coupling left and right frames and a pair of trunnion brackets 19 integrally formed on lower faces at opposite ends of the cross member 16 to open downward and outward in a vehicle width direction. The trunnion brackets 19 have bosses 18 for pivotally supporting trunnion shafts.

20 Claims, 10 Drawing Sheets

U.S. PATENT DOCUMENTS

| | | | | |
|---|---|---|---|---|
| 2,367,434 A * | 1/1945 | Roos | ............................ | 180/9.58 |
| 2,663,571 A * | 12/1953 | Romick | ...................... | 280/680 |
| 2,755,097 A * | 7/1956 | Elconin | ........................ | 280/680 |
| 2,810,587 A * | 10/1957 | Boughner | .................... | 280/680 |
| 3,046,036 A * | 7/1962 | Page | ............................ | 280/680 |
| 3,083,980 A * | 4/1963 | Page | ............................ | 280/680 |
| 3,117,772 A * | 1/1964 | Brown | .......................... | 267/269 |
| 3,227,468 A * | 1/1966 | Raidel | .......................... | 280/682 |
| 3,279,815 A | 10/1966 | Hutchens | | |
| 3,471,165 A * | 10/1969 | Raidel | .......................... | 280/687 |
| 3,977,700 A * | 8/1976 | Leaf | .............................. | 280/685 |
| 4,120,509 A * | 10/1978 | Reeve et al. | ................. | 280/81.6 |
| 4,278,271 A * | 7/1981 | Raidel | .......................... | 280/687 |
| 4,287,958 A * | 9/1981 | Schmidt | ....................... | 177/136 |
| 5,078,420 A * | 1/1992 | Jable et al. | .................... | 280/680 |
| 5,676,356 A * | 10/1997 | Ekonen et al. | ................ | 267/294 |
| 2001/0013691 A1* | 8/2001 | Hosoya | ...................... | 280/124.1 |
| 2003/0047906 A1 | 3/2003 | Hicks et al. | | |
| 2009/0134593 A1* | 5/2009 | Angerfors et al. | ..... | 280/124.133 |

FOREIGN PATENT DOCUMENTS

| | | | | |
|---|---|---|---|---|
| GB | 2063784 A | * | 6/1981 | |
| JP | 59002912 A | * | 1/1984 | |
| JP | 63082879 A | * | 4/1988 | |
| JP | 5 37511 | | 5/1993 | |
| JP | 07205627 A | * | 8/1995 | |
| JP | 7 266818 | | 10/1995 | |
| JP | 08108719 A | * | 4/1996 | |
| JP | 08156562 A | * | 6/1996 | |
| JP | 09039530 A | * | 2/1997 | |
| JP | 09099718 A | * | 4/1997 | |
| JP | 11151922 A | * | 6/1999 | |
| JP | 11-310151 | | 11/1999 | |
| JP | 2002174283 A | * | 6/2002 | |
| JP | 3466913 | | 11/2003 | |
| JP | 2004 203131 | | 7/2004 | |

OTHER PUBLICATIONS

International Search Report issued Oct. 6, 2009 in PCT JP09/003939 filed Aug. 19, 2009.

Supplementary European Search Report issued Sep. 22, 2011, in European Patent Application No. 09 80 9499.

* cited by examiner

006# CROSS MEMBER-INTEGRATED TRUNNION BRACKET

TECHNICAL FIELD

The present invention relates to a cross member-integrated trunnion bracket applicable to a trunnion suspension, for example, used in a large truck having double-axle rear wheels.

BACKGROUND ART

FIGS. 1 to 3 show a so-called trunnion suspension dedicated to tandem axles and having a structure with a trunnion shaft 3 secured to frames 5 through trunnion brackets 4 between a pair of axles 1 and 2 arranged in a tandem along a front-rear direction, leaf springs 6 each being rotatably mounted at its central portion via a rotation base 7 over the trunnion shaft 3 to support the front- and rear-side axles 1 and 2 with opposite ends of the leaf spring 6, upper and lower rods 8 and 9 being arranged for retaining positions of the axles 1 and 2 in the front-rear direction.

A cross member 10 bridges the left and right frames 5 for reinforcement of the frames 5 at positions where the trunnion brackets 4 are secured. Upper rods 8 couple front and rear faces on a central portion of the cross member 10 to upper sides of central portions of the axles 1 and 2, respectively; lower rods 9 couple front and rear faces on lower ends of the trunnion brackets 4 to lower sides of opposite ends of the axles 1 and 2, respectively.

As a result, in such trunnion suspension, up-and-down movements of the front- and rear-side axles 1 and 2 are absorbed by the leaf springs 6; and forces in the front-rear direction are transmitted through the upper and lower rods 8 and 9 to the frames 5 with the leaf springs 6 rotating around the trunnion shaft 3. Thus, favorable driving over a bump is realized.

In the figures, reference numeral 11 denotes U-bolts for mounting the central portion of the leaf spring 6 on the rotation base 7; 12, mounts on the front and rear faces of the central portion of the cross member 10 for the upper rods 8; 13, mounts on the upper sides of the central portions of the axles 1 and 2 for the upper rods 8; 14, mounts on the front and rear faces at the lower ends of the trunnion brackets 4 for the lower rods 9; and 15, mounts on the lower sides at the opposite ends of the axles 1 and 2 for the lower rods 9.

Prior art documents related to this type of trunnion suspension are, for example, Patent Literatures 1 and 2.
Citation List
Patent Literature

[Patent Literature 1] Japanese Patent Publication7-266818A

[Patent Literature 2] Japanese Utility Model Publication 5-037511A

SUMMARY OF INVENTION

Technical Problems

However, in such conventional configuration, the cross member 10 and the trunnion brackets 4 are individually assembled to the frame 5 as respectively shown in FIGS. 4 and 5, so that misalignment may occur in a relative relationship between the cross member 10 and the trunnion brackets 4 due to variances generated during assembling thereof and the arrangement at original proper positions may not be achieved for the axles 1 and 2 coupled to each of the cross member 10 and the trunnion brackets 4 through the upper and lower rods 8 and 9 due to tilt in the front-rear direction or lateral displacement in a vehicle width direction.

Thus, after the assembling of the trunnion suspension, alignment adjustment is required for readjusting the attachment positions of, for example, the upper and lower rods 8 and 9 such that the front- and rear-side axles 1 and 2 are arranged in proper position, and a work burden is problematically increased since considerable effort and time are required for this alignment adjustment.

The invention was conceived in view of the above and has its object to drastically reduce the effort and time required for the alignment adjustment over a conventional case to thereby significantly alleviate the work burden.
Solution to Problems The invention is directed to a cross member-integrated trunnion bracket comprising a cross member coupling left and right frames and a pair of trunnion brackets integrally formed on lower faces at opposite ends of the cross member to open downward and outward in a vehicle width direction, said trunnion brackets having bosses for pivotally supporting trunnion shafts.

Then, this brings about a relative relationship unchanged between the cross member and the trunnion brackets and no misalignment occurs in the relative relationship between the two as in the conventional case; as a result, when axles are coupled to each of the cross member and the trunnion brackets, the positions of the axles are accurately determined in the front-rear direction relative to the cross member and the trunnion brackets, and a situation is avoided where the axles are tilted in the front-rear direction.

As a result, less alignment adjustment is needed to be performed by workers after assembling as compared with the conventional case and the effort and time required for the alignment adjustment can drastically be reduced, so that a work burden is significantly alleviated for the workers engaging in the assembling of the trunnion suspension.

The number of components and the number of assembling steps are significantly reduced because one component, i.e., the cross member-integrated trunnion bracket 20 substitutes for a cross member and left and right trunnion brackets which are conventionally separated into three components, so that the further alleviation of the work burden and the reduction of cost are achieved.

When the invention is specifically implemented, preferably, mounts are formed on the cross member for coupling V-rods and mounts are formed at lower ends of the trunnion brackets for coupling ends of parallel linkage type lower rods.

Thus, the axles can be positioned in the vehicle width direction by coupling the cross member to the front- and rear-side axles through the V-rods, and can be positioned in the front-rear direction by coupling the lower ends of the trunnion brackets to lower sides at opposite ends of the front- and rear-side axles through the parallel linkage type lower rods.

In the invention, a central portion of the cross member may have ribs formed to be continuous with an inclined posture of vehicle-width inner portions on the upper sides of the trunnion brackets, so that an arch structure may be formed as a whole by the ribs, the vehicle-width inner portions on the upper sides of the trunnion brackets and an upper structure of the cross member, which effectively enhances the overall rigidity for the load in the vertical direction by the arch structure.

In the invention, preferably, peripheral parts of the boss of the trunnion bracket are coupled to the frame on the upper side thereof through reinforcing plates, which forms a robust box structure in the vicinity of the bosses by these reinforcing plates, the frames and the cross member-integrated trunnion bracket as a result of coupling the peripheral parts of the boss of the trunnion bracket to the frame on the upper side thereof through the reinforcing plates. The box structure ensures sufficient rigidity to a vertical force input at offset positions outside of the frames.

As a result of the box structure ensuring the sufficient rigidity durable against the vertical force input at offset positions outside of the frames as described above, a trunnion shaft need not serve as a beam coupling the left and right trunnion brackets as in the conventional case, and the trunnion shafts may be separated to the left and right and fitted to the left and right trunnion brackets 19 with a required minimum length (length necessary for attachment of a leaf spring) to achieve considerable weight saving by preventing the trunnion shafts from being large-size components.

Since the cross member is integrally formed with the trunnion brackets into the cross member-integrated trunnion bracket, it is not necessary to provide a large overlap space for the frame as in the conventional trunnion bracket, and the entire cross member-integrated trunnion bracket may be integrated into a simple structure without waste by eliminating portions making less contribution to the strength to achieve considerable weight saving.

In the invention, preferably, coupled locations of the reinforcing plates to the frame are at least partially brought about by fastening together with the cross member, which configures the more robust box structure since the reinforcing plates are directly fastened to both the frame and the cross member.

In the invention, two locations of the trunnion bracket sandwiching the boss in the vehicle front-rear direction may be coupled through the reinforcing plates to appropriate positions on the frame offset from locations immediately above the two locations in the front-rear direction away from each other, which enhances the rigidity against a longitudinal force applied from a road surface as a reaction force to an inertial force upon braking or starting of a vehicle.

Advantageous Effects of Invention

According to the cross member-integrated trunnion bracket of the invention, the following excellent effects can be achieved.

(I) At least the alignment adjustment required due to misalignment in a relative relationship between a cross member and trunnion brackets as in the conventional case is no longer necessary and the alignment adjustment needed to be performed by workers after assembling is considerably alleviated as compared to the conventional case, so that the effort and time required for the alignment adjustment can be drastically reduced, significantly alleviating the work burden for the workers engaging in the assembling of the trunnion suspension.

(II) The number of components and the number of assembling steps can be significantly reduced because one component, i.e., the cross member-integrated trunnion bracket substitutes for a cross member and left and right trunnion brackets which are conventionally separated into three components, so that the alleviation of the work burden can be further achieved and the considerable reduction of cost can be realized.

(III) When mounts are formed on the cross member for coupling V-rods and mounts are formed at lower ends of the trunnion brackets for coupling ends of parallel linkage type lower rods, the front- and rear-side axles can be positioned in the front-rear direction and the vehicle width direction without intervention of the frames by assembling the front- and rear-side axles via the V-rods and the lower rods and, therefore, one constituent unit can be formed by integrating the cross member-integrated trunnion bracket, the front- and rear-side axles, the V-rods and the lower rods to realize a module of an axle support structure which can be assembled before an assembling operation on the frames.

(IV) When the ribs are formed on a central portion of the cross member so as to be continuous with the inclined posture of the vehicle-width inner portions on the upper sides of the trunnion brackets and an arch structure is formed as a whole by the ribs, the vehicle-width inner portions on the upper sides of the trunnion brackets and the upper structure of the cross member, the overall rigidity can be effectively enhanced for the load in the vertical direction by the arch structure, which can achieve considerable weight saving by reducing and eliminating portions making less contribution to the strength in the cross member and the trunnion brackets through the reduction of thickness and the formation of lightening holes.

(V) When the peripheral parts of the boss of the trunnion bracket are coupled to the frame on the upper side thereof through the reinforcing plates, the robust box structure consisting of the reinforcing plates, the frames and the cross member-integrated trunnion bracket can ensure the sufficient rigidity durable against the vertical force input at offset positions outside of the frames. As a result, the trunnion shaft need not serve as a beam coupling the left and right trunnion brackets as in the conventional case and the trunnion shaft can be separated and shortened. Moreover, since the cross member is integrally formed with the trunnion brackets into the cross member-integrated trunnion bracket, the need for a large overlap space for the frame as in the conventional trunnion bracket can be eliminated to integrate the entire cross member-integrated trunnion bracket into a simple structure without waste by eliminating portions making less contribution to the strength and, therefore, the overall structure can be made more compact to achieve considerable weight saving as compared with the conventional case.

(VI) When the coupled locations of the reinforcing plates to the frame are at least partially brought about by fastening together with the cross member, the reinforcing plates can be directly fastened to both the frame and the cross member to configure the more robust box structure.

(VII) When two locations of the trunnion bracket sandwiching the boss in the vehicle front-rear direction are coupled through the reinforcing plates to appropriate positions on the frame offset from locations immediately above the two locations in the front-rear direction away from each other, the rigidity can be enhanced for a longitudinal force applied from a road surface as a reaction force to an inertial force upon braking or starting of a vehicle.

DESCRIPTION OF EMBODIMENT

Figure 1:
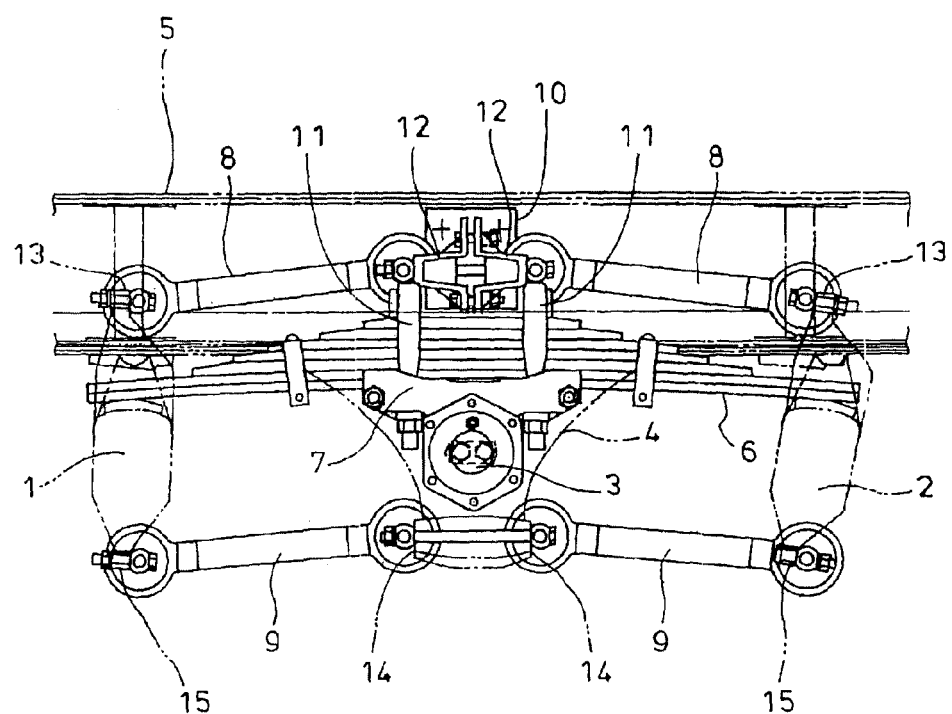
FIG. 1 is a side view showing a structure of a typical trunnion suspension.
Figure 2:
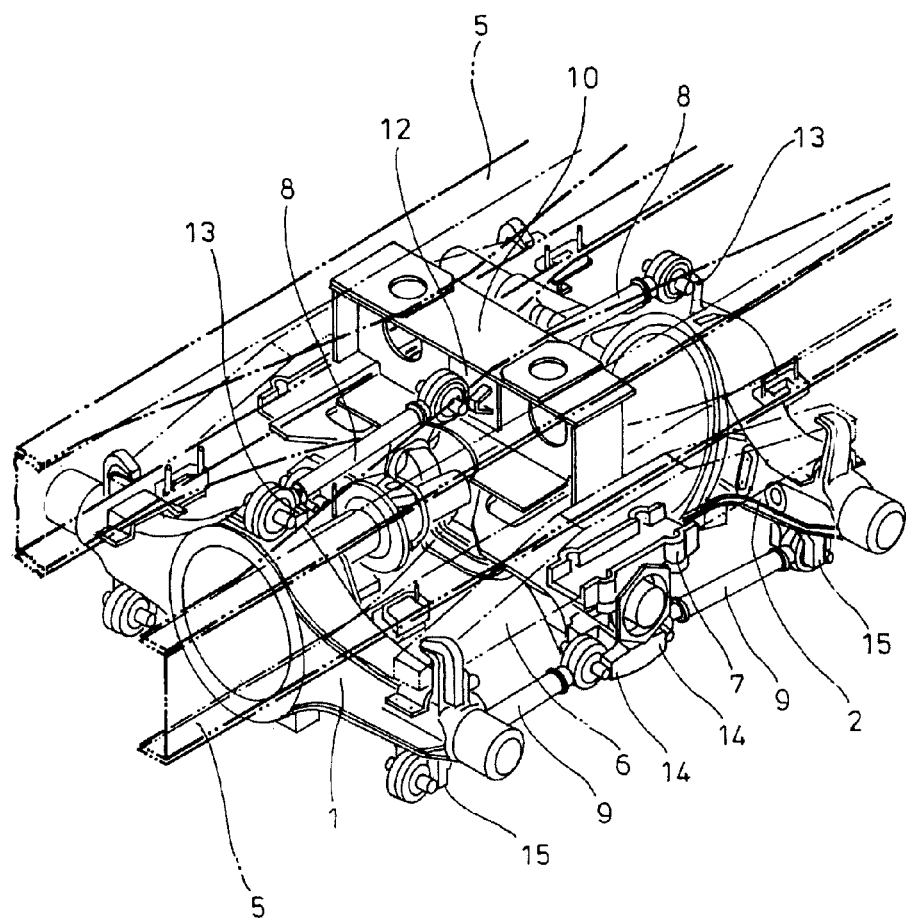
FIG. 2 is a perspective view of FIG. 1.
Figure 3:
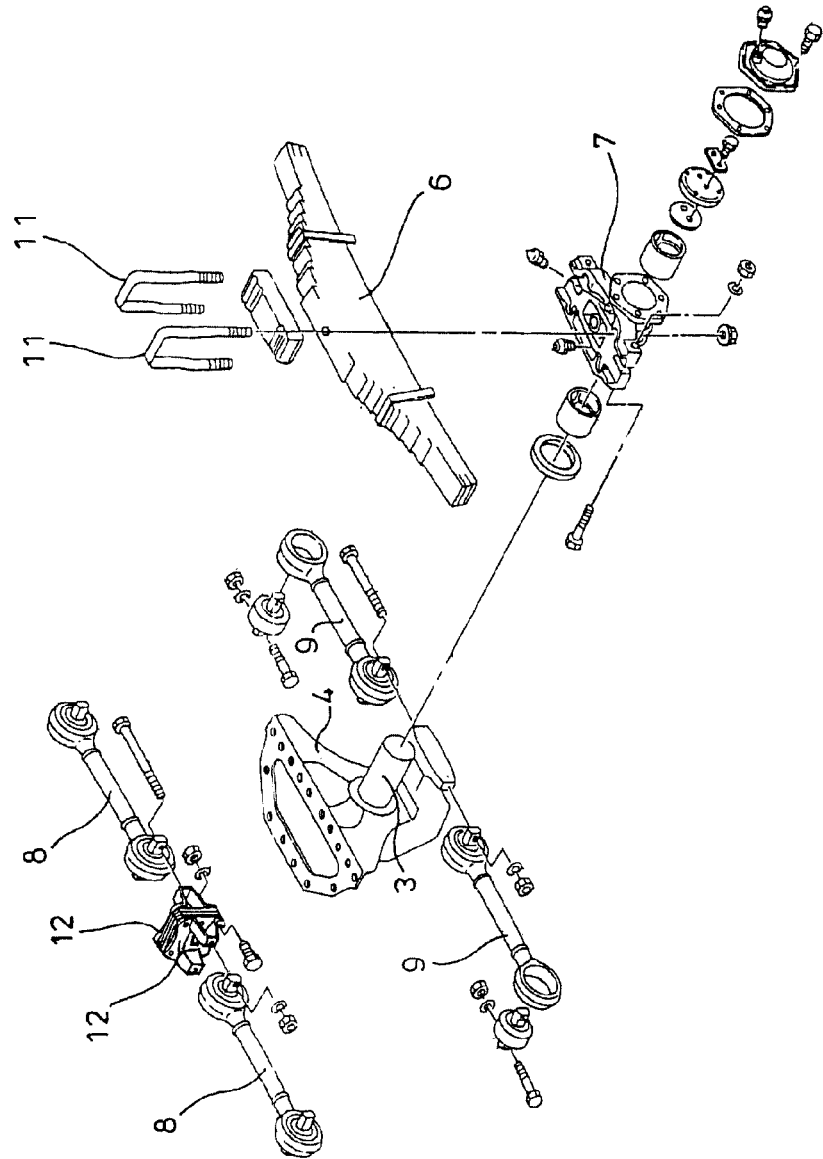
FIG. 3 is an exploded diagram of relevant parts in FIG. 2.
Figure 4:
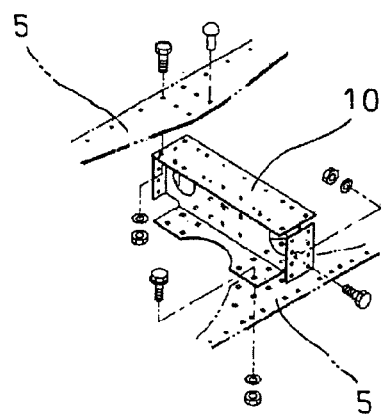
FIG. 4 is a perspective view showing details of a conventional cross member.
Figure 5:
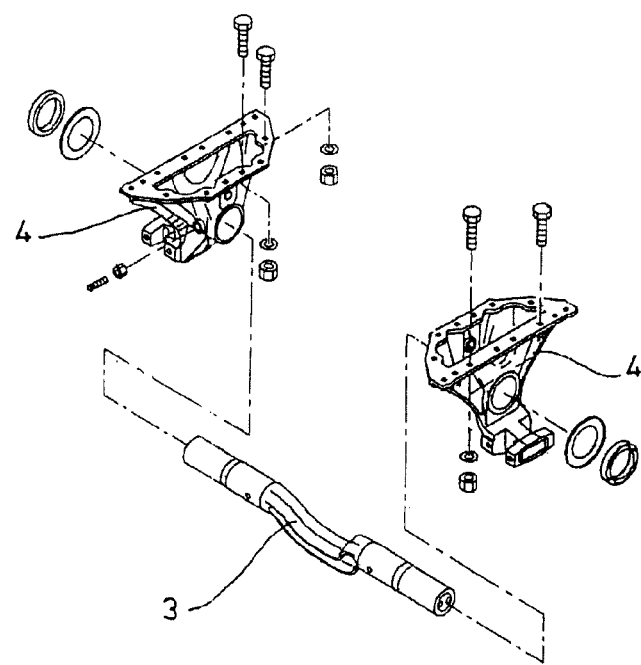
FIG. 5 is a perspective view showing details of a conventional trunnion brackets.

An embodiment of the invention will be described with reference to the drawings.

FIGS. 6 to 11 show the embodiment of the invention in which parts similar to those in FIGS. 1-5 are represented by the same reference numerals.

Figure 6:
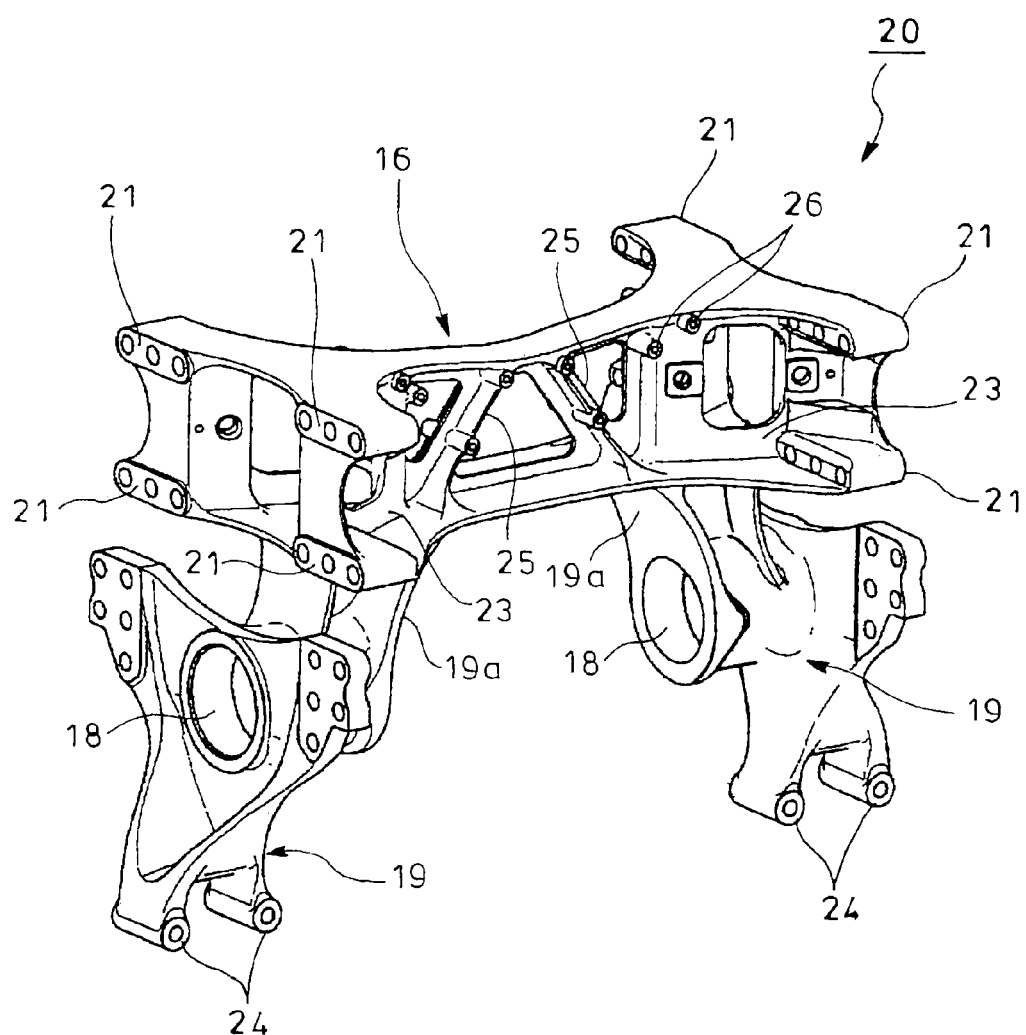
FIG. 6 is a perspective view showing an embodiment of the invention.
Figure 7:
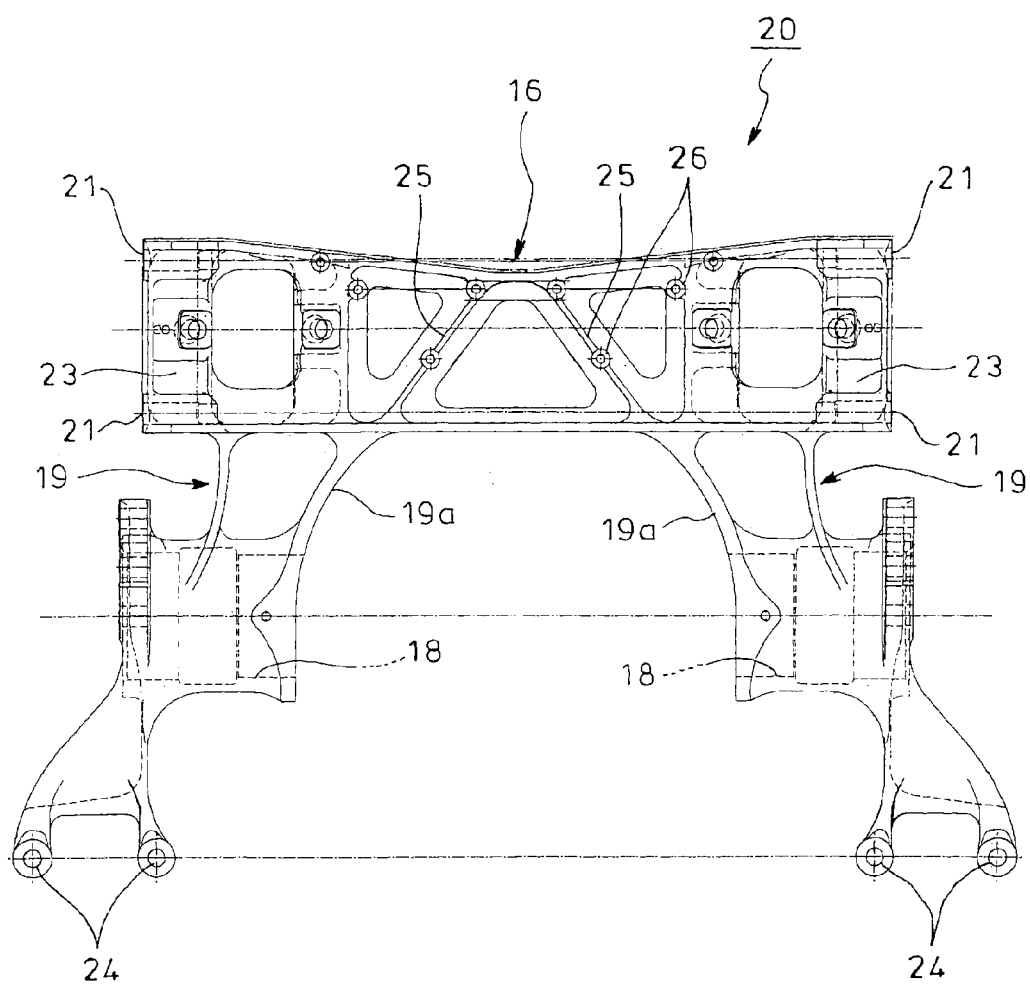
FIG. 7 is a front view of FIG. 6.
Figure 11:
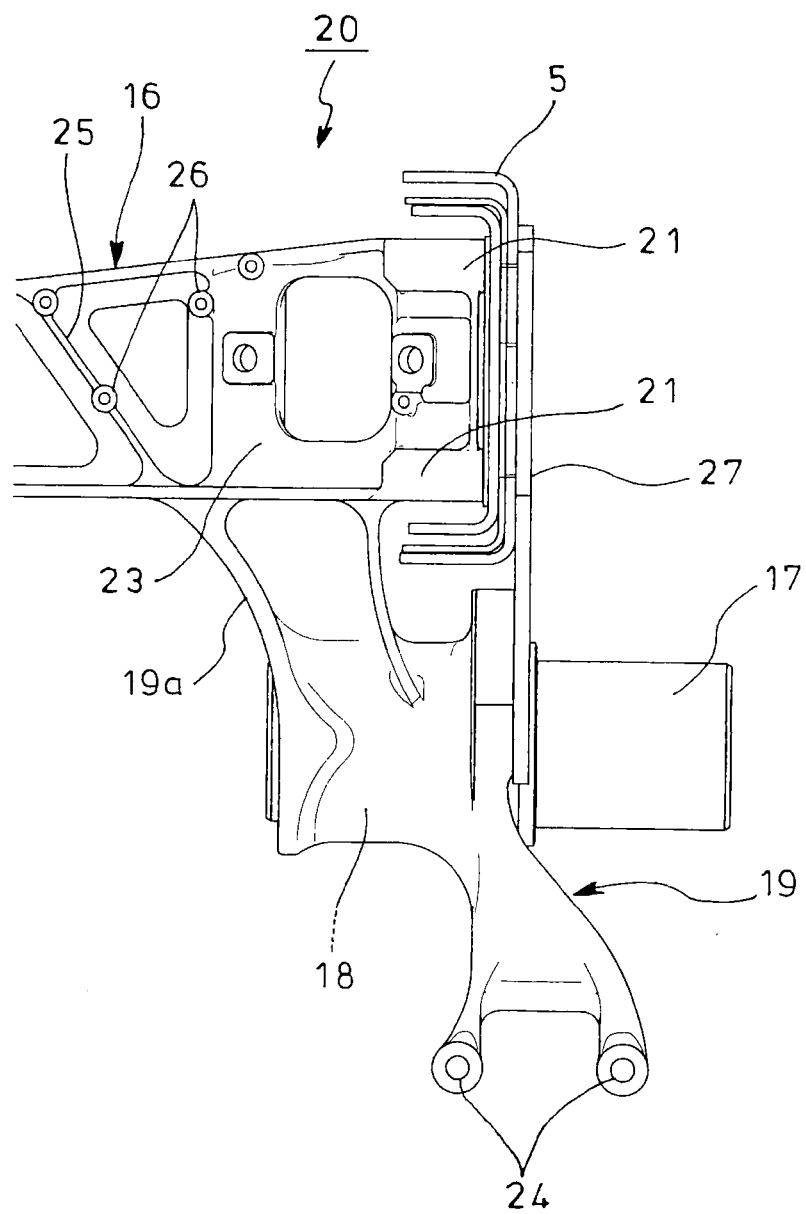
FIG. 11 is an enlarged view for explaining a state of attachment of a reinforcing plate.

In the embodiment, as shown in FIGS. 6 and 7, a cross member-integrated trunnion bracket 20 comprises a cross member 16 coupling left and right frames 5 (see FIG. 8) and a pair of trunnion brackets 19 integrally formed on lower faces at opposite ends of the cross member 16 to open downward and outward in the vehicle width direction and having bosses 18 for pivotally supporting trunnion shafts 17 (see FIG. 11).

The cross member-integrated trunnion bracket 20 is manufactured as an integrally formed cast product applicable in lieu of a cross member and trunnion brackets in a conventional trunnion suspension.

The cross member 16 corresponding to a conventional cross member has opposite ends which are formed with mounts 21 adapted to be bolted to webs of the frames 5 (see FIG. 8) and which are gradually widened toward the webs of the frames 5 when viewed from above; the mounts 21 are arranged with a sufficient span in the longitudinal direction of the frames 5.

Front and rear faces at the opposite ends of the cross member 16 have mounts 23 formed for coupling of open ends of a V-rod 22 (see FIGS. 8 and 10) described later such that inclined surfaces are formed relative to the vehicle width direction, and lower ends of the trunnion brackets 19 have mounts 24 formed for coupling of ends of parallel linkage type lower rods 9 (see FIGS. 8 and 9).

The central portion of the cross member 16 has ribs 25 formed into a chevron shape so as to be continuous with an inclined posture of vehicle-width inner portions 19a on the upper sides of the trunnion brackets 19 so that an arch structure is formed as a whole by the ribs 25, the vehicle-width inner portions 19a on the upper sides of the trunnion brackets 19 and an upper structure of the cross member 16.

In FIGS. 6 and 7, reference numeral 26 denotes inner threads formed for fixing of ducts and wirings by thread-cutting bosses cast together upon integral formation of the cross member-integrated trunnion bracket 20 as described above.

Figure 8:
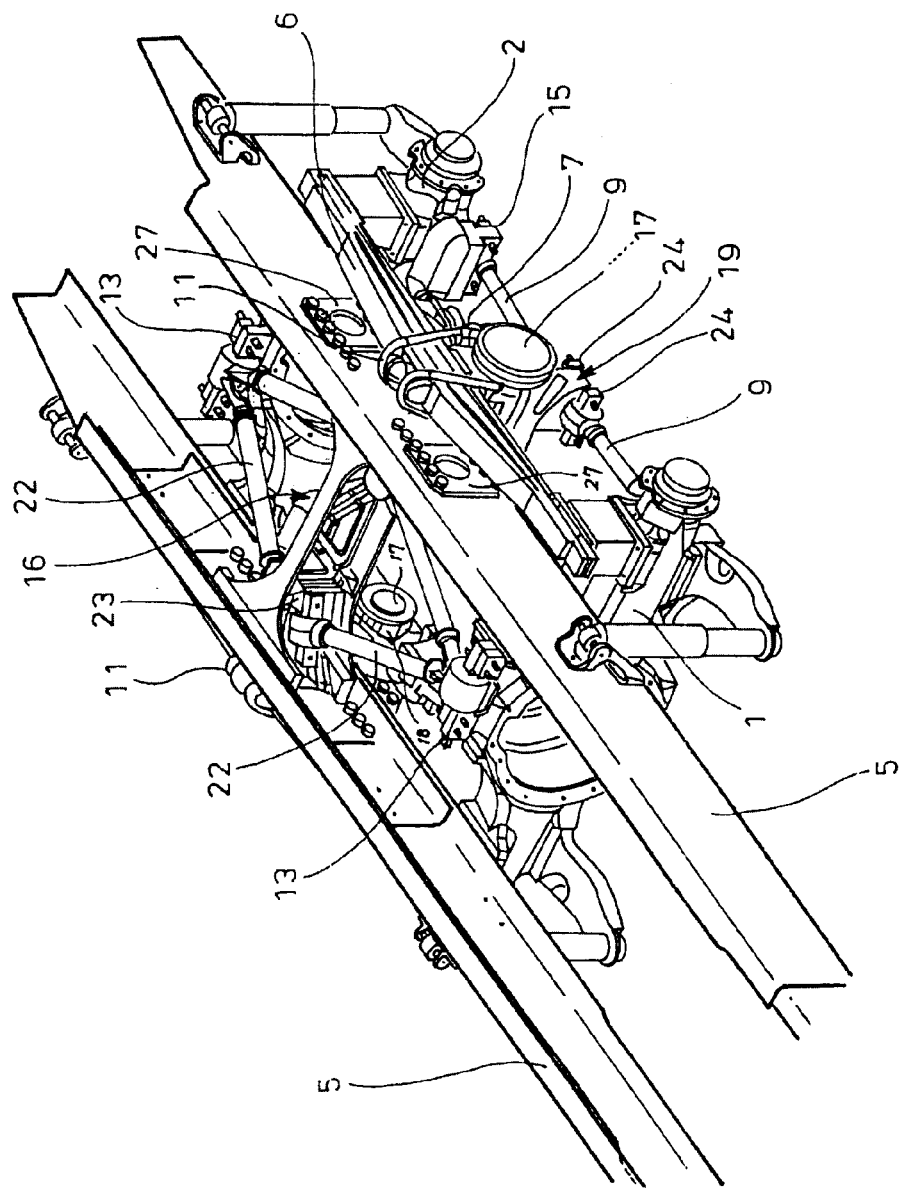
FIG. 8 is a perspective view showing an application of the embodiment to a trunnion suspension.
Figure 9:
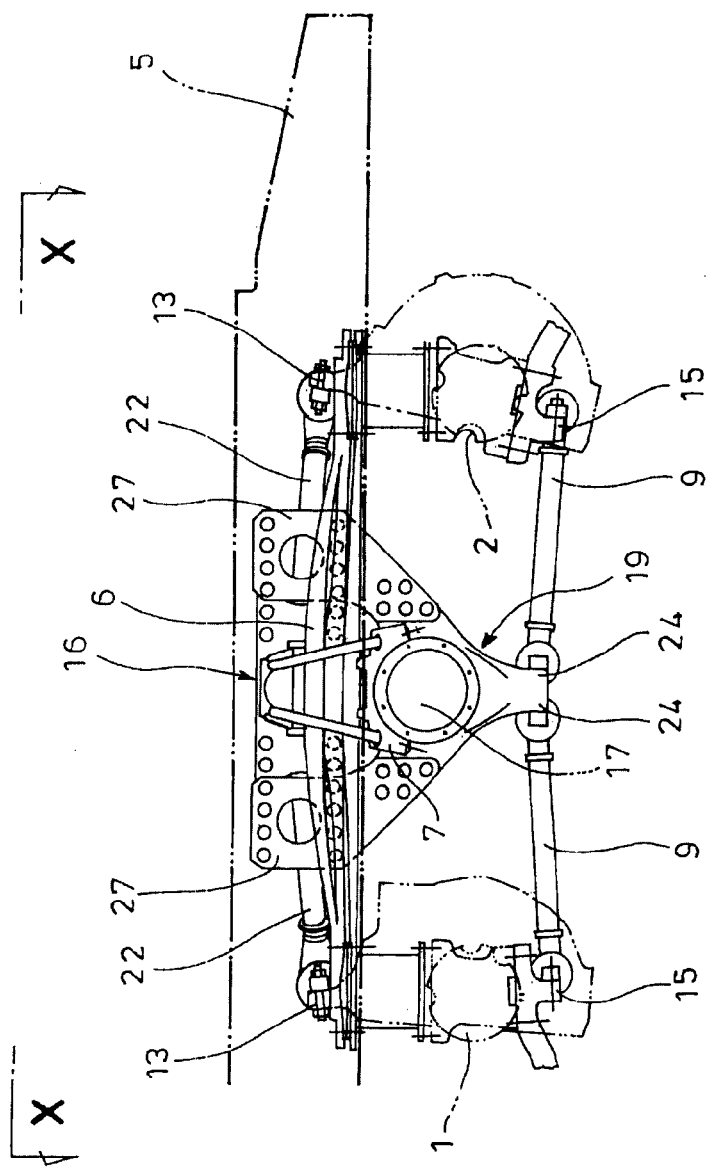
FIG. 9 is a side view of the trunnion suspension shown in FIG. 8.
Figure 10:
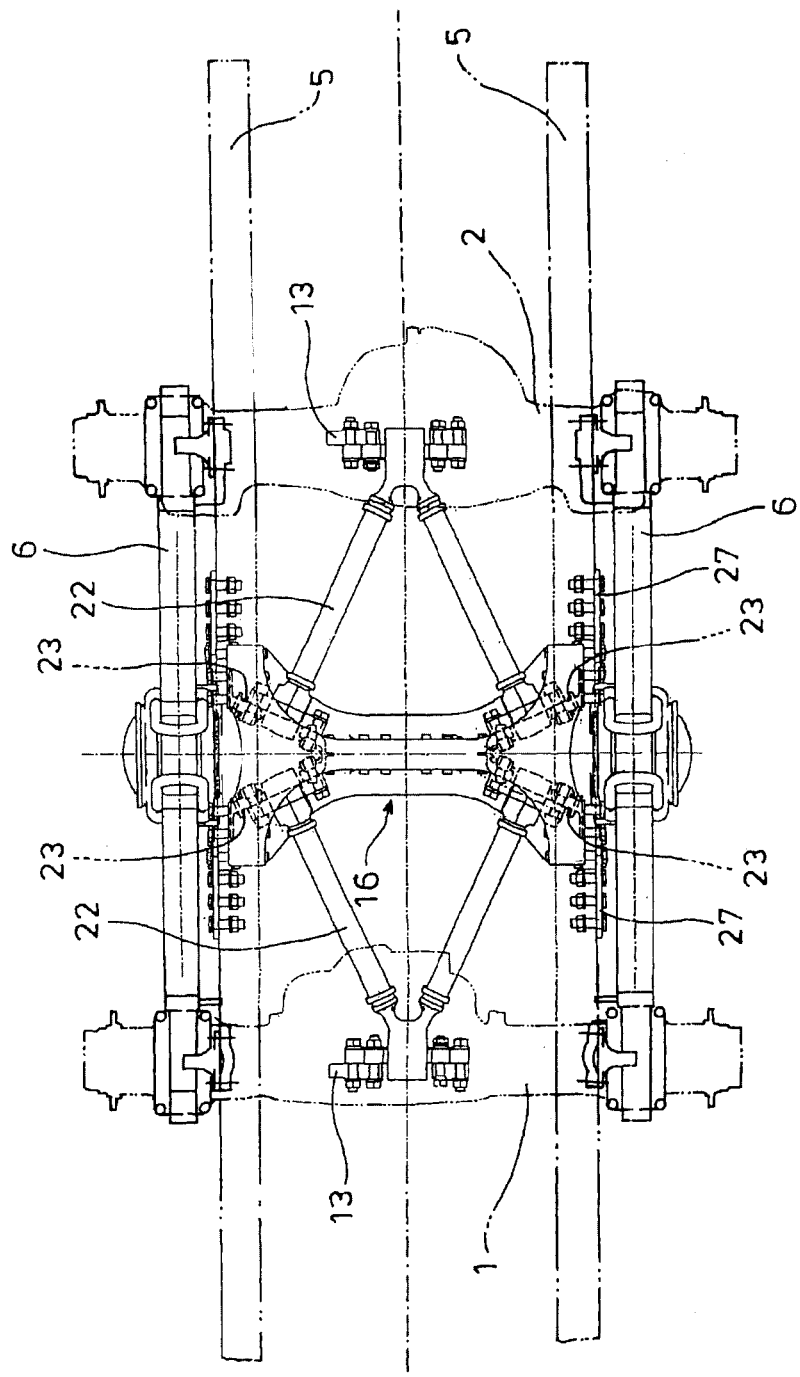
FIG. 10 is a view looking in the direction of arrows X in FIG. 9.

FIGS. 8 to 10 exemplarily show an actual application of the cross member-integrated trunnion bracket 20 as described above to a trunnion suspension. The mounts 23 on the front and rear faces at the opposite ends of the cross member 16 are coupled to the mounts 13 on the upper side of the central portions of the axles 1 and 2 by V-rods 22, respectively. The mounts 24 on the front and rear faces at the lower ends of the trunnion brackets 19 are coupled to the mounts 15 on the lower sides at opposite ends of the axles 1 and 2 by the conventional parallel linkage type lower rods 9, respectively.

The cross member 16 bridges the webs of the right and left frames 5 and are bolted via the mounts 21 to the webs. Each of the bosses 18 of the trunnion brackets 19 has the trunnion shaft 17 fitted and disposed to protrude outward in the vehicle width direction by a predetermined length; a leaf spring 6 is rotatably mounted at its central portion over an protruding end of each of the trunnion shafts 17 via the rotation base 7 in a conventional manner; and opposite ends of the leaf springs 6 are fixed to the upper sides at opposite ends of the front- and rear-side axles 1 and 2.

In the embodiment shown, the trunnion shaft 17 is individually equipped in each of the left and right trunnion brackets 19 instead of a conventional form of sharing one trunnion shaft entirely extending in the vehicle width direction, so that the trunnion shafts 17 cannot serve as a beam coupling the left and right trunnion brackets 19. The embodiment employs a form of coupling peripheral parts of the bosses 18 of the trunnion brackets 19 to the frames 5 on the upper sides thereof through reinforcing plates 27 instead.

In the embodiment illustrated, two locations on the front and rear sides of the trunnion bracket 19 sandwiching the boss 18 are coupled by the two reinforcing plates 27 (which may be a single plate instead) to appropriate positions on the frame 5 offset from locations immediately above the two locations on the front and rear sides in the front-rear direction away from each other; the coupled locations of the reinforcing plates 27 to the webs of the frame 5 are at least partially brought about by fastening together with the mounts 21 of the cross member 16; and, as shown in FIG. 11, a robust box structure is formed by the respective reinforcing plates 27, the frames 5 and the cross member-integrated trunnion bracket 20.

Application of the cross member-integrated trunnion bracket 20 as described above to a trunnion suspension brings about a relative relationship unchanged between the cross member 16 and the trunnion brackets 19 and no misalignment occurs in the relative relationship between the two as in the conventional case; as a result, when the V-rods 22 couple the front and rear faces at the opposite ends of the cross member 16 to the upper side of the central portions of the front- and rear-side axles 1 and 2, respectively, and the parallel linkage type lower rods 9 couple the front and rear faces at the lower ends of the trunnion brackets 19 to the lower sides at the opposite ends of the front- and rear-side axles 1 and 2, respectively, the positions of the axles 1 and 2 are accurately determined in the vehicle width direction by the V-rods 22 relative to the cross member 16 and the trunnion brackets 19 and the positions are also accurately determined in the front-rear direction by the lower rods 9, avoiding situations where the axles 1 and 2 are tilted in the front-rear direction or laterally displaced in the vehicle width direction.

As a result, less alignment adjustment is needed to be performed by workers after assembling as compared with the conventional case and the effort and time required for the alignment adjustment can be drastically reduced, so that the work burden is significantly alleviated for the workers engaging in the assembling of the trunnion suspension.

The number of components and the number of assembling steps are significantly reduced since one component, i.e., the cross member-integrated trunnion bracket 20 substitutes for a cross member and left and right trunnion brackets which are conventionally separated into three components, so that the further alleviation of the work burden and the reduction of cost is achieved.

The robust box structure is formed in the vicinity of the bosses 18 by the reinforcing plates 27, the frames 5 and the cross member-integrated trunnion bracket 20 as a result of coupling the peripheral parts of the bosses 18 of the trunnion brackets 19 to the frames 5 on the upper side thereof through the reinforcing plates 27, so that the box structure ensures sufficient rigidity to a vertical force input at offset positions outside of the frames 5.

Additionally, the vertical force input at offset positions outside of the frames 5 is transmitted from wheels through the front- and rear-side axles 1 and 2, the leaf spring 6 and the trunnion shaft 17 in sequence to the boss 18 of the trunnion bracket 19, so that the box structure formed in the vicinity of the bosses 18 makes extremely significant contribution to the strength.

As a result of the box structure ensuring the sufficient rigidity durable against the vertical force input at offset positions outside of the frames 5 as described above, a trunnion shaft need not serve as a beam coupling the left and right trunnion brackets 19 as in the conventional case, and the trunnion shafts 17 can be separated to the left and right and mounted on the left and right trunnion brackets 19 with a required minimum length (length necessary for attachment of the leaf spring 6) to achieve considerable weight saving by preventing the trunnion shafts 17 from being large-size components.

Since the cross member 16 is integrally formed with the trunnion brackets 19 into the cross member-integrated trunnion bracket 20, it is not necessary to provide a large overlap space for the frame 5 as in the conventional trunnion bracket, and the entire cross member-integrated trunnion bracket 20 can be integrated into a simple structure without waste by eliminating portions making less contribution to the strength to achieve considerable weight saving.

Particularly in the embodiment, the coupled locations of the reinforcing plates 27 to the frame 5 are at least partially brought about by fastening together with the cross member 16 so that each of the reinforcing plates 27 is directly fastened to both the frame 5 and the cross member 16 to configure the more robust box structure. Moreover, two locations of the trunnion bracket 19 sandwiching the boss 18 in the vehicle front-rear direction are coupled by the two reinforcing plates 27 to appropriate positions on the frame 5 offset from locations immediately above the two locations in the front-rear direction away from each other, so that the rigidity is also enhanced for a longitudinal force applied from a road surface as a reaction force to an inertial force upon braking or starting of a vehicle.

Therefore, in the embodiment, at least the alignment adjustment required due to misalignment in a relative relationship between a cross member and trunnion brackets as in the conventional case is no longer necessary and the alignment adjustment needed to be performed by workers after assembling is considerably alleviated as compared with the conventional case, so that the effort and time required for the alignment adjustment can be drastically reduced to significantly alleviate the work burden for the workers engaging in the assembling of the trunnion suspension.

The number of components and the number of assembling steps can be significantly reduced since one component, i.e., the cross member-integrated trunnion bracket 20 substitutes for a cross member and left and right trunnion brackets which are conventionally separated into three components, so that the alleviation of the work burden can be further achieved and the considerable reduction of cost can be realized.

The front- and rear-side axles 1 and 2 can be positioned in the front-rear direction and the vehicle width direction without intervention of the frames 5 by assembling the axles 1 and 2 via the V-rods 22 and the lower rods 9, so that one constituent unit can be formed by integrating the cross member-integrated trunnion bracket 20, the front- and rear-side axles 1 and 2, the V-rods 22 and the lower rods 9 to realize a module of an axle support structure which can be assembled before an assembling operation on the frames 5.

A central portion of the cross member 16 has the ribs 25 formed into a chevron shape so as to be continuous with the inclined posture of the vehicle-width inner portions 19a on the upper sides of the trunnion brackets 19 and an arch structure is formed as a whole by the ribs 25, the vehicle-width inner portions 19a on the upper sides of the trunnion brackets 19 and the upper structure of the cross member 16, so that the overall rigidity can be more effectively enhanced for the load in the vertical direction by the arch structure and considerable weight saving can be achieved by reducing and eliminating portions making less contribution to the strength in the cross member 16 and the trunnion brackets 19 through the reduction of thickness and the formation of lightening holes.

The robust box structure consisting of the respective reinforcing plates 27, the frames 5 and the cross member-integrated trunnion bracket 20 can ensure the sufficient rigidity durable against the vertical force input at offset positions outside of the frames 5; as a result, the trunnion shaft 17 need not serve as a beam coupling the left and right trunnion brackets 19 as in the conventional case, and may be separated and shortened. Moreover, since the cross member 16 is integrally formed with the trunnion brackets 19 into the cross member-integrated trunnion bracket 20, the need for a large overlap space for the frame 5 as in the conventional trunnion bracket can be eliminated to integrate the entire cross member-integrated trunnion bracket 20 into a simple structure without waste by eliminating portions making less contribution to the strength to thereby make the overall structure more compact to achieve considerable weight saving as compared with the conventional case.

The coupled locations of the reinforcing plates 27 to the frame 5 are at least partially brought about by fastening together with the cross member 16, so that each of the reinforcing plates 27 can be directly fastened to both the frame 5 and the cross member 16, leading to the more robust box structure.

Moreover, coupling of two locations of the trunnion bracket 19 sandwiching the boss 18 in the vehicle front-rear direction, through the reinforcing plates 27, to appropriate positions on the frame 5 offset from locations immediately above the two locations in the front-rear direction away from each other can enhance the rigidity for a longitudinal force applied from a road surface as a reaction force to an inertial force upon braking or starting of a vehicle.

It is to be understood that a cross member-integrated trunnion bracket of the invention is not limited to the above embodiment and that various changes and modifications may be made without departing from the scope of the invention.

REFERENCE SIGNS LIST 5 frame
9 lower rod
16 cross member
17 trunnion shaft
18 boss
19 trunnion bracket
19a vehicle-width inner portion
20 cross member-integrated trunnion bracket
21 mount
22 rod
23 mount
24 mount
25 rib
26 inner thread
27 reinforcing plate

The invention claimed is:

1. A cross member-integrated trunnion bracket comprising a cross member coupling left and right frames and a pair of trunnion brackets integrally formed on lower faces of the cross member at opposite ends of the cross member to open downward and outward in a vehicle width direction, said trunnion brackets having bosses for pivotally supporting trunnion shafts.

2. A cross member-integrated trunnion bracket as claimed in claim 1 wherein mounts are formed on the cross member for coupling V-rods and mounts are formed at lower ends of the trunnion brackets for coupling ends of parallel linkage type lower rods.

3. A cross member-integrated trunnion bracket as claimed in claim 2 wherein a central portion of the cross member has ribs formed to be continuous with an inclined posture of vehicle-width inner portions on the upper sides of the trunnion brackets, so that an arch structure is formed as a whole by the ribs, the vehicle-width inner portions on the upper sides of the trunnion brackets and an upper structure of the cross member.

4. A cross member-integrated trunnion bracket as claimed in claim 3 wherein peripheral parts of the boss of the trunnion bracket are coupled to the frame on an upper side thereof through reinforcing plates.

5. A cross member-integrated trunnion bracket as claimed in claim 4 wherein coupled locations of the reinforcing plates to the frame are at least partially brought about by fastening together with the cross member.

6. A cross member-integrated trunnion bracket as claimed in claim 5 wherein two locations of the trunnion bracket sandwiching the boss in a vehicle front-rear direction are coupled through the reinforcing plates to appropriate positions on the frame offset from locations immediately above said two locations in the front-rear direction away from each other.

7. A cross member-integrated trunnion bracket as claimed in claim 4 wherein two locations of the trunnion bracket sandwiching the boss in a vehicle front-rear direction are coupled through the reinforcing plates to appropriate positions on the frame offset from locations immediately above said two locations in the front-rear direction away from each other.

8. A cross member-integrated trunnion bracket as claimed in claim 2 wherein peripheral parts of the boss of the trunnion bracket are coupled to the frame on an upper side thereof through reinforcing plates.

9. A cross member-integrated trunnion bracket as claimed in claim 8 wherein coupled locations of the reinforcing plates to the frame are at least partially brought about by fastening together with the cross member.

10. A cross member-integrated trunnion bracket as claimed in claim 9 wherein two locations of the trunnion bracket sandwiching the boss in a vehicle front-rear direction are coupled through the reinforcing plates to appropriate positions on the frame offset from locations immediately above said two locations in the front-rear direction away from each other.

11. A cross member-integrated trunnion bracket as claimed in claim 8 wherein two locations of the trunnion bracket sandwiching the boss in a vehicle front-rear direction are coupled through the reinforcing plates to appropriate positions on the frame offset from locations immediately above said two locations in the front-rear direction away from each other.

12. A cross member-integrated trunnion bracket as claimed in claim 1 wherein a central portion of the cross member has ribs formed to be continuous with an inclined posture of vehicle-width inner portions on the upper sides of the trunnion brackets, so that an arch structure is formed as a whole by the ribs, the vehicle-width inner portions on the upper sides of the trunnion brackets and an upper structure of the cross member.

13. A cross member-integrated trunnion bracket as claimed in claim 12 wherein peripheral parts of the boss of the trunnion bracket are coupled to the frame on an upper side thereof through reinforcing plates.

14. A cross member-integrated trunnion bracket as claimed in claim 13 wherein coupled locations of the reinforcing plates to the frame are at least partially brought about by fastening together with the cross member.

15. A cross member-integrated trunnion bracket as claimed in claim 14 wherein two locations of the trunnion bracket sandwiching the boss in a vehicle front-rear direction are coupled through the reinforcing plates to appropriate positions on the frame offset from locations immediately above said two locations in the front-rear direction away from each other.

16. A cross member-integrated trunnion bracket as claimed in claim 13 wherein two locations of the trunnion bracket sandwiching the boss in a vehicle front-rear direction are coupled through the reinforcing plates to appropriate positions on the frame offset from locations immediately above said two locations in the front-rear direction away from each other.

17. A cross member-integrated trunnion bracket as claimed in claim 1 wherein peripheral parts of the boss of the trunnion bracket are coupled to the frame on an upper side thereof through reinforcing plates.

18. A cross member-integrated trunnion bracket as claimed in claim 17 wherein coupled locations of the reinforcing plates to the frame are at least partially brought about by fastening together with the cross member.

19. A cross member-integrated trunnion bracket as claimed in claim 18 wherein two locations of the trunnion bracket sandwiching the boss in a vehicle front-rear direction are coupled through the reinforcing plates to appropriate positions on the frame offset from locations immediately above said two locations in the front-rear direction away from each other.

20. A cross member-integrated trunnion bracket as claimed in claim 17 wherein two locations of the trunnion bracket sandwiching the boss in a vehicle front-rear direction are coupled through the reinforcing plates to appropriate positions on the frame offset from locations immediately above said two locations in the front-rear direction away from each other.

* * * * *